July 18, 1967 — J. W. DILLON ET AL — 3,331,414

EGG YOLK SEPARATOR

Filed April 5, 1965

INVENTORS
JESSE W. DILLON
FLORENCE R. DILLON

United States Patent Office 3,331,414
Patented July 18, 1967

3,331,414
EGG YOLK SEPARATOR
Jesse W. Dillon and Florence R. Dillon, Livingston, Mont.
(both of P.O. Box 264, Springdale, Utah 84767)
Filed Apr. 5, 1965, Ser. No. 445,459
4 Claims. (Cl. 146—2)

This invention relates generally to kitchen utensils, and more specifically to a device for separating the yolk from the albumen of an egg.

There have been many attempts made to design a satisfactory device which will quickly and efficiently enable the separation of a yolk from an egg. All of these devices rely on the capability of the albumen to flow freely through small holes or slots. This method is slow and does not always result in a clean and complete separation, and due to the serrations can often result in the breaking of the yolk.

It is therefore a primary object of this invention to provide an improved egg yolk separating device which is simple to use, and ensures a complete separation of the yolk from the albumen without danger of breaking the yolk.

It is a further object of this invention to provide a yolk separating device which performs the operations of separating and dispensing the white of an egg in one simple movement.

It is a still further object of this invention to provide an egg yolk separator which is simple in construction, easy to clean, and which can be manufactured in an economical manner to enable retail at low cost.

Further objects and advantages of this invention will become apparent from the following detailed description of a preferred embodiment thereof, taken in conjunction with the attached drawings wherein.

Similar reference characters indicate corresponding parts throughout the several views in the drawing.

Figure 1:
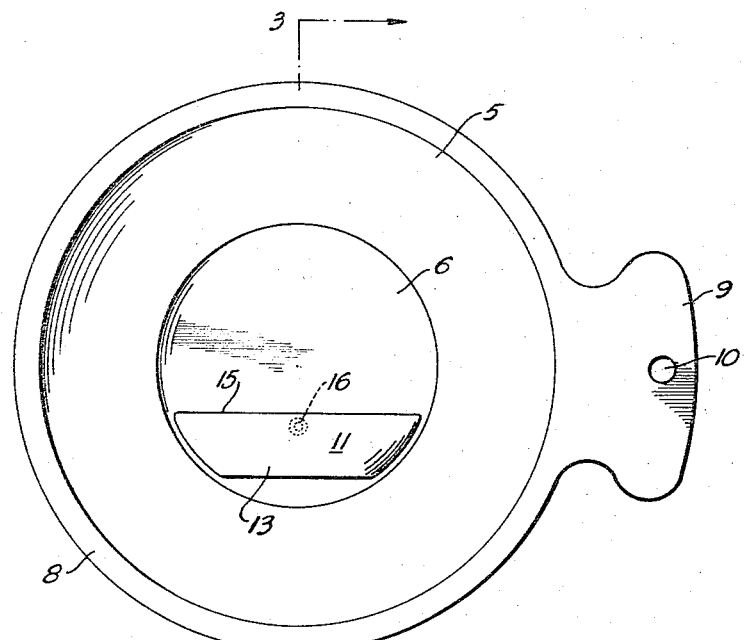
FIG. 1 is a plan view of the device showing the holder grip projecting outwardly from the surrounding rim of the dish.
Figure 2:
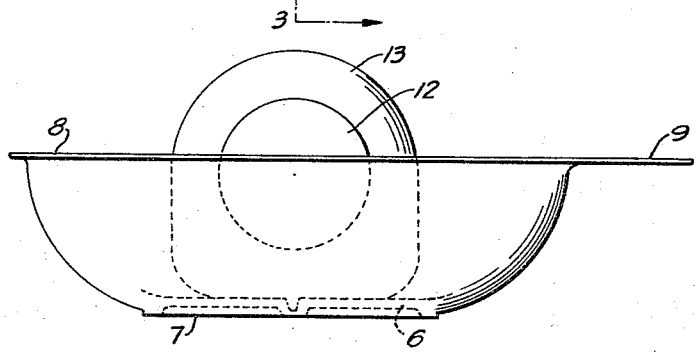
FIG. 2 is a front elevation of the device which comprises our invention.
Figure 3:
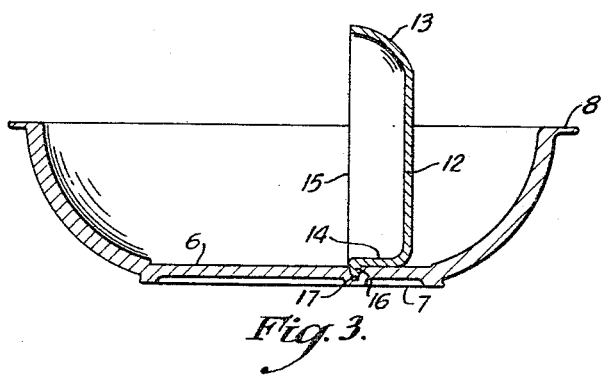
FIG. 3 is a cross sectional elevation of the device taken along the lines 3—3 of FIG. 1.

Referring now to the drawings in detail, the numeral 5 represents a circular dish having a circular and flat base 6. The base has a short downwardly extending peripheral rim 7 as is conventional, and the dish terminates upwardly with a horizontally projecting peripheral lip 8 to provide rigidity to the dish and to enable the contents to be poured therefrom. The dish 5 may be injection molded in polyethylene or polystyrene, or if desired may be formed of suitably glazed china. The peripheral lip 8 extends at 9 to form a holder or grip of any suitable configuration. A small hole 10 is formed through the grip 9 to provide a convenient means for hanging the device on a suitable hook.

A yolk cup 11 is mounted permanently or removably to the top of the flat circular base 6 and is made only large enough to retain the yolk of an egg. The cup has a flat circular base 12 which is partially surrounded by semi-circular inwardly concave wall 13. The wall 13 connects at each end with a straight flat wall 14 which is adapted to abut in a flush manner with the circular base 6 of the dish 5. The length of flat wall 14 must be restricted so as not to extend beyond the periphery of the base 6. It is preferred that the edges 15 of the walls 13 and 14 fall in a plane normal to the base 6 and with the straight edge thereof of lesser length than the diameter of the base 6.

As already explained the cup may be permanently secured to the base, or to facilitate the operation of cleaning a small peg 16 may be formed centrally of the flat wall 14 for removably locating in a hole 17 formed in the base 6. Other methods of removably connecting the two components may of course be substituted.

In operation an egg may be cracked by striking against the top of the semi-circular wall 13 and opening such that the contents fall into the dish 5. It will be noted that there is no danger of spilling or dribbling the albumen over the side of the dish during this operation. Having dispensed the egg into the dish the grip is then grasped in the hand and the dish is merely decanted or rotated through 90 degrees in a plane normal to the cup base 12. The yolk will be retained by the cup and the white of the egg will be freed and dispensed into a prepared container.

Having described the invention with considerable particularity, it should be understood that various modifications may be made to the detail thereof, without departing from the scope or spirit of the invention as defined in the appended claims.

We claim:
1. A yolk separating device, comprising, a dish, a flat base forming part of the dish, a yolk cup secured to the base with an opening directed parallel to the plane of the base, a flat side wall for the cup disposed flush with the base of the dish, the side wall being shorter than the diameter of the base and restricted within the confines of the base.

2. A yolk separating device according to claim 1, wherein said base is circular in shape, a peripheral lip extending from the upper edge of the dish, a hand grip projecting from the lip, said yolk cup having a semicircular arcuate wall connecting the ends of the flat side wall.

3. A yolk separating device according to claim 2, wherein means extend between the cup and the dish to removably secure the flat side of the cup and the base of the dish together, said grip having a hole formed therethrough.

4. A yolk separating device, comprising, a circular dish, a flat circular base forming the bottom of the dish, a peripheral lip extending outwardly from the top of the dish, a hand grip secured to the lip, a yolk cup having a flat base extending normally to the base of the dish, said cup having a flat wall in an abutting relation with the base of the dish, means securing said dish and said cup together, said cup being restricted in size to the average volume of an egg yolk.

References Cited

UNITED STATES PATENTS

| | | | |
|---|---|---|---|
| 1,101,041 | 6/1914 | Schenk | 146—2 |
| 2,723,695 | 11/1955 | Willsey | 146—2 |
| 2,867,254 | 1/1959 | Mowat | 146—2 |

WILLIAM W. DYER, Jr., *Primary Examiner.*
W. G. ABERCROMBIE, *Assistant Examiner.*